(12) United States Patent
Ben Ezra

(10) Patent No.: US 12,360,715 B2
(45) Date of Patent: Jul. 15, 2025

(54) METHOD FOR DEVELOPING A PRINTING PLAN

(71) Applicant: Advanced Vision Technology (A. V. T.) Ltd., Hod Hasharon (IL)

(72) Inventor: Barry Ben Ezra, Ramat Hasharon (IL)

(73) Assignee: ADVACED VISION TECHNOLOGY (A.V.T.) LTD., Hod Hasharon (IL)

( * ) Notice: Subject to any disclaimer, the term of this patent is extended or adjusted under 35 U.S.C. 154(b) by 0 days.

(21) Appl. No.: 18/730,652

(22) PCT Filed: Jan. 20, 2023

(86) PCT No.: PCT/IB2023/050512
§ 371 (c)(1),
(2) Date: Jul. 19, 2024

(87) PCT Pub. No.: WO2023/139539
PCT Pub. Date: Jul. 27, 2023

(65) Prior Publication Data
US 2025/0138764 A1    May 1, 2025

Related U.S. Application Data

(60) Provisional application No. 63/301,797, filed on Jan. 21, 2022.

(51) Int. Cl.
*G06F 3/12* (2006.01)
*G01J 3/10* (2006.01)
*G01N 21/89* (2006.01)

(52) U.S. Cl.
CPC .............. *G06F 3/1275* (2013.01); *G01J 3/10* (2013.01); *G01N 21/89* (2013.01); *G06F 3/1203* (2013.01); *G06F 3/1251* (2013.01)

(58) Field of Classification Search
CPC .... G06F 3/1275; G06F 3/1203; G06F 3/1251; G01J 3/10; G01N 21/89
(Continued)

(56) References Cited

U.S. PATENT DOCUMENTS

2009/0079971 A1    3/2009  Toma et al.
2011/0205601 A1*   8/2011  Akimoto .............. G03G 21/046
                                                        358/475
(Continued)

FOREIGN PATENT DOCUMENTS

EP    3428624 A1    1/2019

OTHER PUBLICATIONS

International Search Report (PCT/ISA/210) and Written Opinion (PCT/ISA/237) mailed on Jun. 12, 2023, by the European Patent Office as the International Searching Authority for International Application No. PCT/IB2023/050512, 14 pages.
(Continued)

*Primary Examiner* — Allen H Nguyen
(74) *Attorney, Agent, or Firm* — BUCHANAN INGERSOLL & ROONEY PC

(57) ABSTRACT

A method for printing a plurality of instances of a printed image on a substrate includes providing one or more units of substrate for receiving the plurality of instances, providing information documenting a plurality of measured characteristics for each unit, developing a printing plan based at least in part upon the information documenting the plurality of measured characteristics, and printing the plurality of instances in accordance with the printing plan. The printing plan includes one or more of: a screen having one or more characteristics tailored at least in part to at least one color value based upon the measured characteristics, a mapping of color specifications for the plurality of instances of the printed image indexed to location on the substrate unit or
(Continued)

partial unit, and a mapping of one or more no-print locations indexed to location on the substrate unit or partial unit.

21 Claims, 2 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 2012/0081426 A1* | 4/2012 | Rossell | B41J 3/60 |
| | | | 347/16 |
| 2012/0081753 A1* | 4/2012 | Rufes | B41J 3/60 |
| | | | 358/1.18 |
| 2019/0018628 A1 | 1/2019 | Sloan et al. | |
| 2019/0056895 A1 | 2/2019 | Herrmann et al. | |
| 2019/0311233 A1* | 10/2019 | Kouguchi | B41J 11/46 |

OTHER PUBLICATIONS

International Preliminary Report on Patentability (PCT/IB/326) mailed on Aug. 2, 2024, by the International Bureau for International Application No. PCT/IB2023/050512, 12 pages.

* cited by examiner

METHOD FOR DEVELOPING A PRINTING PLAN

CROSS REFERENCE TO RELATED APPLICATIONS

This application is a U.S. National Phase of International Application No. PCT/IB2023/050512 filed Jan. 20, 2023, which claims priority to U.S. Provisional Application Ser. No. 63/301,797, filed Jan. 21, 2022, both of which are incorporated herein by reference in their entireties.

FIELD OF THE INVENTION

Aspects of the invention relate to printing, in general, and to methods and workflows for developing a printing plan.

BACKGROUND OF THE INVENTION

Printing substrates such as foils and paper are typically created in rolls (i.e. a length of substrate wound onto a reel or carrier) of material during the manufacturing process. These manufacturing unit rolls (also sometimes referred to as a batch) may than be divided (e.g., by cutting parallel to the axis of the roll, slitting perpendicular to the axis of the roll, or both) into sub-sections or sub-units and may further be cut into sheets, creating an end-use unit of printing material. The printing substrate may be shipped to customers in complete units (i.e., all end-use units derived from the same manufacturing unit rolls), however, a shipment may contain a non-complete unit (i.e. fewer than all end-use units derived from the same manufacturing unit roll).

The characteristics (e.g., color, damage) of the substrate along the length thereof are not uniform. The color and other physical characteristics of the substrate may vary and the substrate may exhibit defects (e.g., scratches, stains, etc.) in various positions along the length thereof. Such fluctuations may impact the amount of material wasted when starting a print operation and thus impact press utilization, as well as the uniformity of the quality of the final printed product.

It is also known that paper may have any number of characteristics, some of which arise during the manufacturing of the paper and at least some of which are measured. These characteristics may include, for example, spectral reflectance values, color (which may be determined from the spectral reflectance values), reflectance, absorption, and defects (e.g., scratches, stains and the like). These characteristics, if measured, are typically measured along the length of the substrate, during the manufacturing, of the parent manufacturing unit roll, prior to the sub-divisions thereof, such that each characteristic measurement is associated with a respective position along the length of the substrate (e.g., distance from the start of the roll). The characteristic measurements and the respective position of those measurements on the parent manufacturing unit roll are stored in a database, and may be associated with the ID of the respective manufacturing unit roll, or only associated with the manufacturing unit ID. However, once the manufacturing unit roll is divided into sub-units or sheets, the measurements associated with the parent manufacturing unit roll are typically not divided accordingly and are not inherited by the sub-divided material, in which case the sub-divided material bears no documentation regarding these measurements.

Growing amounts of paper are being manufactured by recycling used paper. The quality and uniformity of recycled paper is typically lower than that of paper made from virgin tree pulp, and may have defects created by the recycling process, as well as color variations that are a result of the lack of uniformity of the recycled mass. Likewise, other recycled materials used as a substrate (e.g. a plastic or metal foil) may have similar defects.

Rasterizing, with or without screening, is a process that converts an image to be printed into dots of varying size, shape and spacing between dots to produce gradient-like effects interpreted by the human eye in a way that corresponds to the shades in the original image. The result of the rasterizing process is referred to herein as 'a screen'. The screen may then be fabricated into a printing plate or similar physical means (e.g., silk screens), which enables selective transfer of ink to the substrate, or the screen may be used to formulate instructions provided to digital printing equipment (e.g. thermal or ink jet printers). The appearance of the color of the printed design on the substrate may vary with different screens. The color of the substrate impacts the color of the printed image, and is thus taken into consideration in the rasterizing and screening operations. Known techniques employ color measurements from only a small region of the manufacturing unit roll or sub-unit thereof, or an average for the manufacturing unit roll, as this is typically the only information available, and assumes that these measurements are correct for the entire length of the end-use unit substrate section.

BRIEF DESCRIPTION OF THE DRAWINGS

The disclosed technique will be understood and appreciated more fully from the following detailed description taken in conjunction with the drawings in which.

SUMMARY OF THE INVENTION

Figure 1:
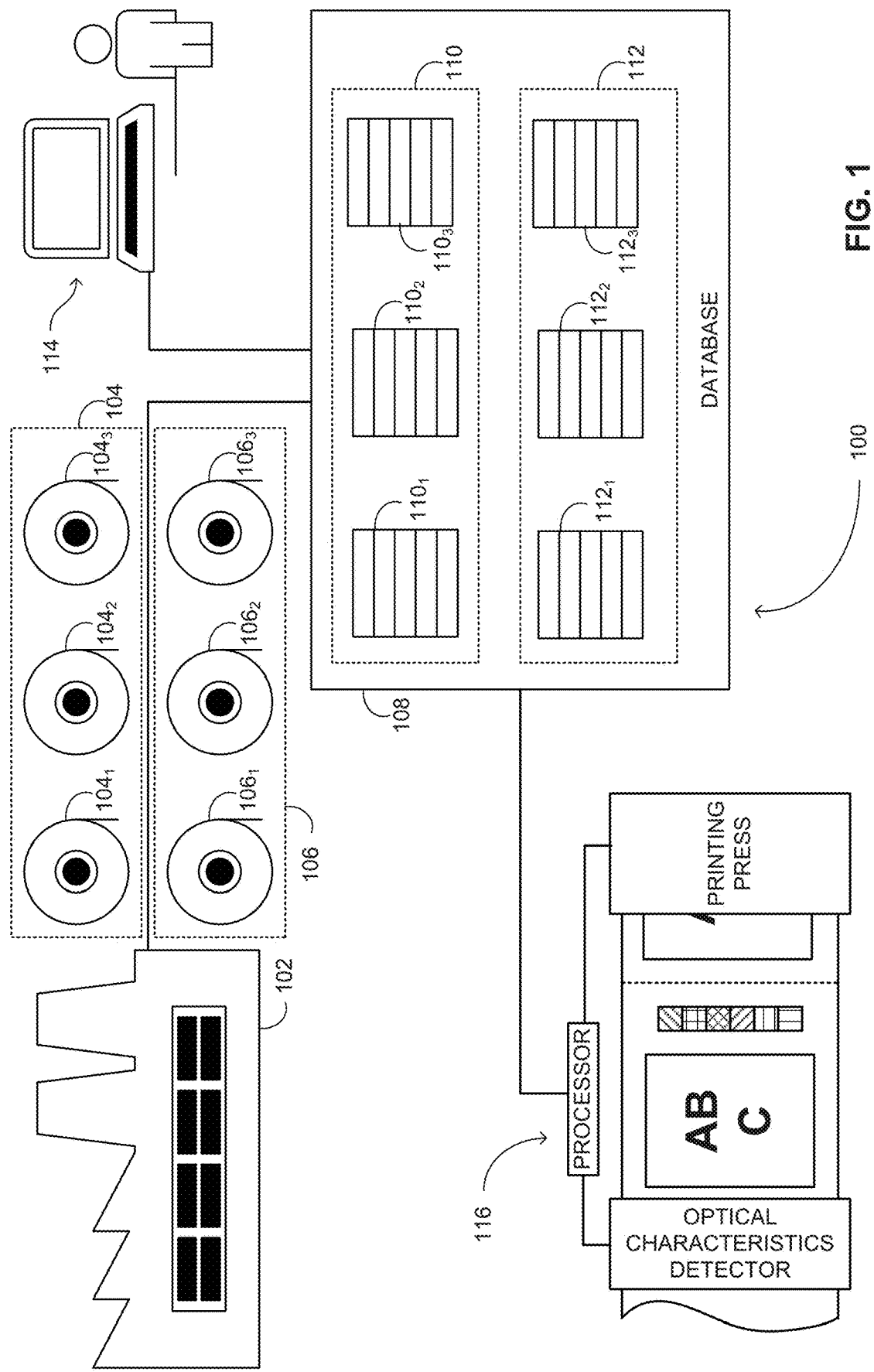
FIG. 1 is a schematic illustration of a workflow a printing plan for a design to be printed, operative in accordance with an embodiment of the disclosed technique.

One aspect of the invention relates to a method for printing a plurality of instances of a printed image on a substrate. The method comprises providing one or more units of substrate for receiving the plurality of instances of the printed image, each unit having a unique unit identifier, the unit having a length from a beginning to an end of the unit and an index system with index identifiers for identifying discrete locations along the length the unit. Information documenting a plurality of measured characteristics for each unit of substrate is provided, each measured characteristic corresponding to a measurement obtained from a measurement location within the unit and indexed to the measurement location. The method includes developing a printing plan based at least in part upon the information documenting the plurality of measured characteristics of the one or more units of substrate. The printing plan includes the unique unit identifier corresponding to each unit included in the printing plan, and optionally the index identifiers corresponding to a beginning location and an end location of any partial unit included in the printing plan, and one or more of a at least one screen having one or more characteristics tailored at least in part to at least one color value based upon the measured characteristics, a mapping of color specifications for the plurality of instances of the printed image indexed to the location along the length of each unit or partial unit thereof, and a mapping of one or more no-print locations indexed to the location along the length of each unit or partial unit thereof. The plurality of instances of the printed image are then printed on the one or more units of substrate in accordance with the printing plan.

The method may include identifying the one or more no-print locations where the substrate exhibits a defect that exceeds a predetermined size, exhibits a number of defects that exceed a predetermined number, exhibits a color value that deviates from a reference color value by a predetermined difference, or a combination thereof. The reference color value may be an average or median color value based upon a plurality of color values measured at a plurality of locations for each unit or partial unit. Each color value may include a value derived from a measurement performed with a spectrophotometer or spectroscope, such as a spectral reflectance or spectral absorption value.

The unit of substrate may comprise a recycled material, such as paper, plastic, or metal. Each unit of substrate may comprise a fractional portion of a manufacturing unit roll of the substrate, and may comprise a roll or plurality of sheets of substrate.

The color specifications may each include specification of a type of one or more inks, an amount of one or more inks, a temperature of the one or more inks, or a combination thereof. In a digital printing method, the mapping of color specifications may include adopting a first ink combination for a first location within the one or more units of substrate and a second ink combination for a second location within the one or more units of substrate. Additionally, in a digital printing method, the mapping of color specifications may include adopting a first screen when creating the digital raster image for a first location within the one or more units of substrate and a second screen when creating the digital raster image for a second location within the one or more units of substrate. In a printing method including printing with a printing plate, the method may include implementing the screen during a platemaking workflow and producing the printing plate from a printing plate precursor based upon the screen.

The information documenting the plurality of measured characteristics for each unit of substrate may include a database stored in non-transitory memory media. The database may include for each measured characteristic, the unique unit identifier and the index identifier corresponding to the location where each measured characteristic was measured. The method may include measuring each measured characteristic at the corresponding measurement location, and storing in the database each measured characteristic along with the unique unit identifier and the index identifier corresponding to the location where each measured characteristic was measured.

Another aspect of the invention relates to a system for developing a printing plan for printing a plurality of instances of a printed image on a substrate. The system includes one or more units of substrate for receiving the plurality of instances of the printed image, each unit having a unique unit identifier, the unit having a length from a beginning to an end of the unit and an index system with index identifiers for identifying discrete locations along the length the unit. A database of information documents a plurality of measured characteristics for each unit of substrate, each measured characteristic corresponding to a measurement obtained from a measurement location within the unit and indexed to the measurement location. Computer memory means include documentation of a printing plan based at least in part upon the information documenting the plurality of measured characteristics of the one or more units of substrate. The printing plan comprises the unique unit identifier corresponding to each unit included in the printing plan, and optionally the index identifiers corresponding to a beginning location and an end location of any partial unit included in the printing plan; and one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof. The system further includes a printing system configured to print the plurality of instances on the one or more units of substrate in accordance with the printing plan.

In some embodiments, the printing system comprises a digital printing system configured to adopt a first ink combination for a first location within the one or more units of substrate and a second ink combination for a second location within the one or more units of substrate. Additionally, in a digital printing system, the mapping of color specifications may include adopting a first screen when creating the digital raster image for a first location within the one or more units of substrate and a second screen when creating the digital raster image for a second location within the one or more units of substrate. In some embodiments, the printing system comprises system for printing with a printing plate, wherein the printing plate is derived from the screen. Another aspect of the invention relates to a method for designing a printing plan for printing a plurality of instances of a printed image on a substrate. The method includes receiving information documenting a plurality of measured characteristics for one or more units of substrate for receiving the plurality of instances of the printed image and developing a printing plan based at least in part upon the information documenting the plurality of measured characteristics of the one or more units of substrate. Each unit has a unique unit identifier, and has a length from a beginning to an end of the unit and an index system with index identifiers for identifying discrete locations along the length the unit. Each measured characteristic corresponds to a measurement obtained from a measurement location within the unit and indexed to the measurement location. The printing plan comprises the unique unit identifier corresponding to each unit included in the printing plan, and optionally the index identifiers corresponding to a beginning location and an end location of any partial unit included in the printing plan; and one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof.

Yet another aspect of the invention relates to a method for printing a plurality of instances of a printed image on a substrate. The method includes the steps of receiving one or more units of substrate for receiving the plurality of instances of the printed image, receiving information documenting a plurality of measured characteristics for each unit of substrate, and receiving a printing plan based at least in part upon the information documenting the plurality of measured characteristics of the one or more units of substrate. Each unit has a unique unit identifier, a length from a beginning to an end of the unit, and an index system with index identifiers for identifying discrete locations along the length the unit. Each measured characteristic corresponds to a measurement obtained from a measurement location within the unit and indexed to the measurement location. The printing plan comprises: the unique unit identifier corresponding to each unit included in the printing plan, and optionally the index identifiers corresponding to a beginning location and an end location of any partial unit included in the printing plan; and one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof. The method further includes printing the plurality of instances of the printed image on the one or more units of substrate in accordance with the printing plan.

Still another aspect of the invention relates to a method for providing a substrate for receiving a plurality of instances of a printed image on a substrate. The method includes the steps of creating a first roll of substrate having a first length from a beginning to an end of the unit, measuring a plurality of measured characteristics for each roll of substrate, creating one or more units of substrate from the first roll, providing a database of information stored in non-transitory memory media, and providing each unit of substrate to a designer or a printer of the printed image along with access to the database of information. Each measured characteristic corresponds to a measurement obtained from a measurement location within the roll and is indexed to the measurement location using an index system having index identifiers for identifying discrete locations along the length the roll. Each unit has indexed beginning and end locations, and is assigned a unique unit identifier. The database comprises for each measured characteristic, the unique unit identifier and the index identifier corresponding to the location where each measured characteristic was measured.

A further aspect of the invention relates to non-transitory memory media programmed with machine readable instructions for causing a processor to perform the steps of receiving information documenting a plurality of measured characteristics for one or more units of substrate for receiving the plurality of instances of the printed image, and developing a printing plan based at least in part upon the information documenting the plurality of measured characteristics of the one or more units of substrate. Each unit has a unique unit identifier, a length from a beginning to an end of the unit, and an index system with index identifiers for identifying discrete locations along the length the unit. Each measured characteristic corresponds to a measurement obtained from a measurement location within the unit and indexed to the measurement location. The printing plan comprises: the unique unit identifier corresponding to each unit included in the printing plan, and optionally the index identifiers corresponding to a beginning location and an end location of any partial unit included in the printing plan; and one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof.

Yet a further aspect of the invention relates to non-transitory memory media programmed with machine readable instructions for causing a processor to perform the steps of receiving information documenting a plurality of measured characteristics for one or more units of substrate for receiving the plurality of instances of the printed image, and receiving a printing plan based at least in part upon the information documenting the plurality of measured characteristics of the one or more units of substrate. Each unit has a unique unit identifier, a length from a beginning to an end of the unit, and an index system with index identifiers for identifying discrete locations along the length the unit. Each measured characteristic corresponds to a measurement obtained from a measurement location within the unit and indexed to the measurement location. The printing plan comprises the unique unit identifier corresponding to each unit included in the printing plan, and optionally the index identifiers corresponding to a beginning location and an end location of any partial unit included in the printing plan; and one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof. The media further includes instructions for printing the plurality of instances of the printed image on the one or more units of substrate in accordance with the printing plan.

DETAILED DESCRIPTION OF THE INVENTION

The methods and systems disclosed herein address the disadvantages of the prior art by providing a method and system for providing information relating to the characteristics of each end-use unit of a substrate, or portion thereof, to designers and printers, and for determining a printing plan for a design to be printed in accordance with that information. Having information relating to the characteristics of each end-use unit or portion thereof enables designers and printers to provide printing specifications tailored to the characteristics of the individual shipped end-use units of the substrates provided by the manufacturer of the substrate.

For example, the color of the substrate affects the perceived colors of the printed product. As such, when printers are provided with information relating to the color of the substrate along the length thereof, or even the average color of the specific individual shipped end-use units of substrate, the printers may be able to control the colors being deposited on the substrate such that the resulting perceived color will correspond more closely to the color specified by the designers.

As another example, when the substrate incudes defects which may affect the quality of the printed product (e.g., a scratch or a visible stain), and the location of these defects is known, the printing press may temporarily stop printing until the defect is skipped.

There are many parameters in the conventional printing process that influence the final color of the printed product, including image screens, curves, and press profiles. These impact the image data from which the printing plate is generated, and are calibrated towards specific printing conditions identified by a set of parameters including, among others, substrate, ink, anilox and sticky-back tape. This results in the printing plate being optimized for the printing condition. The closer the color and other characteristics of the actual substrate are to the characteristics assumed when creating the screens, curves, and profiles, the quicker the press will reach the required target colors.

The screen may be determined, for example, by using the average color value of the specific selected end-use unit or pack of sheets and not just measurements based upon the entire parent manufacturing unit roll. A screen so designed will produce a printed design that better matches the design intended by the designers. When the screen is tailored to the actual substrate, less time and material is wasted when tuning and verifying the color at the start of a new print job.

An exemplary printing plan may include an output profile tailored to a first substrate having known characteristics, including spectral characteristics. The printing plan may also include a color strategy, which may convert input process and spot ink values into output ink values, given some parameters, including parameters relating to the measured substrate color values. When information regarding a second substrate with different spectral characteristics relative to the first substrate is known, a new output profile may be calculated using an algorithm. An exemplary algorithm may dictate that for each point in the profile:

$$NSpec = Fn(OSpec, OSub, NSub) \quad (1)$$

Such as, for example:

$$NSpec = (OSpec/OSub) * NSub \quad (1A)$$

Where:
Nspec=New spectrum value (output ink profile value for new substrate)
OSpec=Old spectrum value (output ink profile value for old substrate)
OSub=Old substrate color value
NSub=New substrate color value Another exemplary algorithm may include hyperparameters:

$$NSpec = (OSpec^a / OSub^b) * NSub^c)^d \quad (1B)$$

The color strategy may then be recalculated using the new profile values, keeping all of the other settings intact. The new color data is then sent to the RIP (raster image processor), which will produce new screens. Alternatively, instead of recalculating the entire strategy, which may be slow, a post-processing step may be added to the strategy in an alternative implementation.

As yet a further example, an end-use unit to be employed during the printing process may be selected according to the characteristics thereof. For example, an end-use unit that exhibits the smallest deviations from the average color thereof may be selected for a print job for which substrate color may be a particularly important consideration. As a further example, the substrate section with the smallest number of defects may be selected for a job for which defects will result in rejection of the final product. Conversely, end-use units with larger deviations in color and defects may be reserved for jobs that have greater tolerances for variation in the respective characteristics. When more than one end-use unit is employed for the print job, then additional end-use units with similar average color values may be selected for the print job. Determining a printing plan according to the characteristics of the substrate potentially reduces waste and potentially improves press utilization.

The foregoing implementation may be particularly useful in conventional (i.e. non-digital) printing embodiments, where using a different screen entails making a new plate. Embodiments of the invention may include software that helps a converter locate units of substrate for re-prints that are as close as possible to the substrate units used for a first print, so that it is not necessary to make a new "substrate-matched" plate.

Reference is now made to FIG. 1, which is a schematic illustration of a workflow for determining a printing specification for a design to be printed, generally referenced 100, operative in accordance with an embodiment of the disclosed technique. According to workflow 100, substrate manufacturer 102 manufactures manufacturing unit rolls 104 and 106 which are further divided into end-use units $104_1$, $104_2$ and $104_3$ and end-use units $106_1$, $106_2$ and $106_3$ respectively. Substrate manufacturer 102 measures the characteristics of a substrate. These characteristics are, for example, spectral reflectance values, color, reflectance, absorption, and defects. These characteristics are measured along the length of the substrate such that each characteristic measurement is associated with a respective position along the length of the substrate (e.g., distance from the start of the roll). Furthermore, the substrate manufacturer 102 associated each one of rolls 104 and 106 with a respective ID. Substrate manufacturer 102 may further associate each end-use unit $104_1$, $104_2$ and $104_3$ and end-use unit $106_1$, $106_2$ and $106_3$ with a respective ID related to the ID of the parent manufacturing unit roll. Substrate manufacturer 102 stores in database 108 entries 110 respective of the characteristics measurements (i.e., and associated position) of manufacturing unit roll 104 and entries 112 respective of the characteristics measurements of manufacturing unit roll 106. Furthermore, substrate manufacturer 102 further associates the stored entries with respective ones of end-use units $104_1$, $104_2$ and $104_3$ and end-use units $106_1$, $106_2$ and $106_3$. Accordingly, entries $110_1$ are associated with end-use unit $104_1$, entries $110_2$ are associated with end-use unit $104_2$ and entries $110_3$ are associated with end-use unit $104_3$. Similarly, entries $112_1$ are associated with end-use unit $106_1$, entries $112_2$ are associated with end-use unit t $106_2$ and entries $112_3$ are associated with end-use unit $106_3$.

Database 108 is accessible to a designer 114 as well as to the printers 116. The access to the characteristic measurements of the manufactured rolls and sub-units enables the designers 114 and printers 116 to determine a printing plan of the printing process according to the characteristics of the substrates provided by the manufacturer. The printing plan includes for example, the IDs of the manufacturing unit rolls and/or end-use units which are to employed for the printing process, the screen employed for each end-use unit, a mapping between the substrate position and the colors to be deposited at that position and no-print sections. The no-print sections are determined, for example, as the section where the substrate exhibits a defect that exceeds a predetermined size or number of defects that exceed a predetermined number or both. A no-print section may alternatively or additionally be determined where the color of the substrate deviates from a reference color (e.g., the average color of the substrate section, or the median color of the substrate section) by a predetermined value (e.g., the ΔE from the average color is above a predetermined value).

Figure 2:
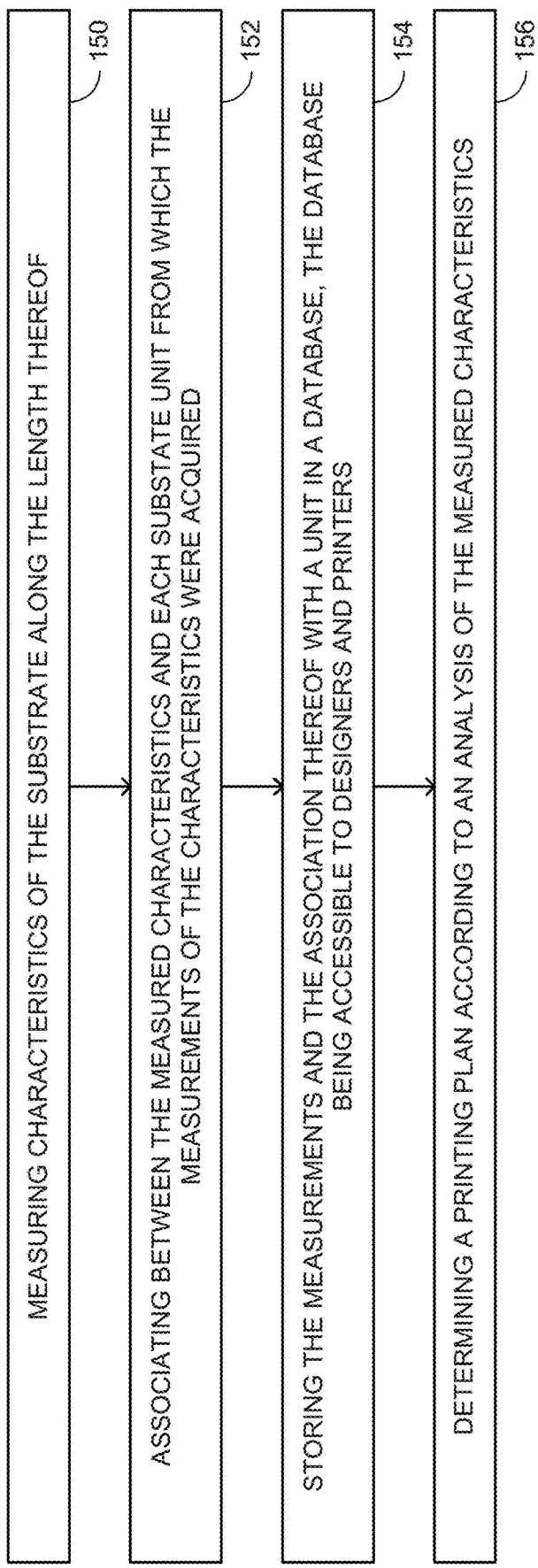
FIG. 2, which is a schematic illustration of a method for determining a printing plan for a design to be printed, operative in accordance with another embodiment of the disclosed technique.

Reference is now made to FIG. 2, which is a schematic illustration of a method for determining a printing plan for a design to be printed, operative in accordance with another embodiment of the disclosed technique. In procedure 150 characteristics of the substrate are measured along the length thereof. These characteristics are, for example, spectral reflectance values, color (which may be determined from the spectral reflectance values), reflectance, absorption, and defects (e.g., scratches, stains and the like). Typically, spectral reflectance values are determined using a spectrometer. Defects are detected from images of the substrate. Reflectance and absorption are determined measured by spectroscopes, such as absorption spectroscopes, as are well known in the art. With reference to FIG. 1, substrate manufacturer determines the characteristics of the substrate along the length thereof.

In procedure 152, the characteristics measurements are associated with respective manufacturing unit roll and end-use unit from which the measurements were acquired.

In procedure 154, the measurements and the association thereof with a manufacturing unit roll and end-use unit are stored in a database. The database is accessible to designers and printers.

In procedure 156, a printing plan is determined according to analysis of the measured characteristics. Determining a printing plan may be an iterative process. For example, the designer designs an initial design to be printed with respective colors. The designer then interrogates the database to determine the end-use unit(s) with respective substrate color that best matches the designed colors (e.g., with respect to the average color and the standard deviation of the color of the end-use unit). The designer may then modify the designed colors to match the selected sub-unit or sub-units such that the resulting printed color shall best match the perceived color of the printed design. The designer may then provide the printers with the design and the ID of the selected end-use unit(s). Typically, a design to be printed is provided in the form of a file (e.g., in Portable Document Format-PDF), which includes information relating to the different color designs (i.e., also referred to as layers or separations) from which the design is composed, as well as a composite image of the design (e.g., an RGB image). The printers determine a mapping between the colors (e.g., the amount of ink, the type of the ink or the temperature of the ink) being deposited on the substrate, and the length (i.e., position) of the substrate. This allows for fluctuations in the color of the substrate along the length thereof. The printers may also define no-print sections at positions where the substrate exhibits a defect or defects.

Although discussed primarily with respect to characterizing, documenting, and sharing characteristics of end-use units that are smaller than manufacturing unit rolls, it should be understood that the invention is also applicable to end-use units constituting entire manufacturing unit rolls and to portions of end-use units as well. For example, a single end-use unit may comprise a plurality of partial end-use units for which the average features for each portion are documented and shared. The characteristics of each partial end-use unit may be indexed to reference positions within the end-use unit, such as a beginning location and an end location for each partial end-use unit relative to a beginning location position for the end-use unit. Likewise, the characteristics of each end-use unit may be indexed to reference positions within the manufacturing unit. Thus, as used herein, unless expressly specified otherwise, the general term "unit" as used to refer to substrate may refer to any discrete quantity of substrate material, including manufacturing unit rolls, end-use rolls or sheets, or portions of any of the foregoing.

Thus, one aspect of the invention relates to a method for printing a plurality of instances of a printed image on a substrate. The method includes providing one or more units of substrate for receiving the plurality of instances of the printed image, each unit having a unique unit identifier, the unit having a length from a beginning to an end of the unit and an index system with index identifiers for identifying discrete locations along the length the unit. The method includes providing information documenting a plurality of measured characteristics for each unit of substrate, each measured characteristic corresponding to a measurement obtained from a measurement location within the unit and indexed to the measurement location. The method includes developing a printing plan based at least in part upon the information documenting the plurality of measured characteristics of the one or more units of substrate. The printing plan includes the unique unit identifier corresponding to each unit included in the printing plan, and optionally the index identifiers corresponding to a beginning location and an end location of any partial unit included in the printing plan. The printing plan also includes one or more of: at least one screen having one or more characteristics tailored at least in part to at least one color value based upon the measured characteristics; a mapping of color specifications for the plurality of instances of the printed image indexed to the location along the length of each unit or partial unit thereof; and a mapping of one or more no-print locations indexed to the location along the length of each unit or partial unit thereof. The plurality of instances of the printed image are then printed on the one or more units of substrate in accordance with the printing plan.

In the case of non-digital printing, the utilization of color and other characteristics along the length or the substrate is limited to preparing a printing plan prior to actually loading the material on the press. In digital printing presses, the color and other information may be utilized to change the print settings "on the fly" as the substrate advances within the printing press itself, because digital printing systems are not limited to a single physical device (e.g. a printing plate) that reflects the screen. The screen in digital printing is a set of digital information that is contained in digital data files, and can be changed to match the progress of the substrate in the printing press.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for printing a plurality of instances of a printed image on a substrate, the method comprising:
    providing one or more units of substrate for receiving the plurality of instances of the printed image, each unit having a unique unit identifier, the unit having a length from a beginning to an end of the unit and an index system with index identifiers for identifying discrete locations along the length the unit;
    providing information documenting a plurality of measured characteristics for each unit of substrate, each measured characteristic corresponding to a measurement obtained from a measurement location within the unit and indexed to the measurement location;
    developing a printing plan based at least in part upon the information documenting the plurality of measured characteristics of the one or more units of substrate, wherein the printing plan comprises:
    the unique unit identifier corresponding to each unit included in the printing plan, and optionally the index identifiers corresponding to a beginning location and an end location of any partial unit included in the printing plan; and one or more of:
- at least one screen having one or more characteristics tailored at least in part to at least one color value based upon the measured characteristics;
- a mapping of color specifications for the plurality of instances of the printed image indexed to the location along the length of each unit or partial unit thereof; and
- a mapping of one or more no-print locations indexed to the location along the length of each unit or partial unit thereof;

printing the plurality of instances of the printed image on the one or more units of substrate in accordance with the printing plan.

2. The method of claim 1, comprising identifying the one or more no-print locations where the substrate exhibits a defect that exceeds a predetermined size, exhibits a number of defects that exceed a predetermined number, exhibits a color value that deviates from a reference color value by a predetermined difference, or a combination thereof.

3. The method of claim 2, wherein the reference color value comprises an average or median color value based upon a plurality of color values measured at a plurality of locations for each unit or partial unit.

4. The method of claim 2, wherein each color value comprises a value derived from a measurement performed with a spectrophotometer or spectroscope.

5. The method of claim 2, wherein each color value comprises a spectral reflectance or spectral absorption value.

6. The method of claim 1, wherein the unit of substrate comprises a recycled material.

7. The method of claim 6, wherein the recycled material comprises paper, plastic, or metal.

8. The method of claim 1, wherein the color specifications each include specification of a type of one or more inks, an amount of one or more inks, a temperature of the one or more inks, or a combination thereof.

9. The method of claim 1, wherein the printing method is a digital printing method, and the mapping of color specifications includes adopting a first ink combination for a first location within the one or more units of substrate and a second ink combination for a second location within the one or more units of substrate.

10. The method of claim 1, wherein the printing method comprises printing with a printing plate, and the method comprises implementing the at least one screen during a platemaking workflow and producing the printing plate from a printing plate precursor based upon the at least one screen.

11. The method of claim 1, wherein each unit of substrate comprises a fractional portion of a manufacturing unit roll of the substrate.

12. The method of claim 11, wherein each unit of substrate comprises a roll or plurality of sheets of substrate.

13. The method of claim 1, wherein the information documenting the plurality of measured characteristics for each unit of substrate comprises a database stored in non-transitory memory media, the database comprising for each measured characteristic, the unique unit identifier and the index identifier corresponding to the location where each measured characteristic was measured.

14. The method of claim 13, further comprising: measuring each measured characteristic at the corresponding measurement location; and
storing each measured characteristic along with the unique unit identifier and the index identifier corresponding to the location where each measured characteristic was measured in the database.

15. A system for developing a printing plan for printing a plurality of instances of a printed image on a substrate, the system comprising:
one or more units of substrate for receiving the plurality of instances of the printed image, each unit having a unique unit identifier, the unit having a length from a beginning to an end of the unit and an index system with index identifiers for identifying discrete locations along the length the unit;
a database of information documenting a plurality of measured characteristics for each unit of substrate, each measured characteristic corresponding to a measurement obtained from a measurement location within the unit and indexed to the measurement location;
means for documenting a printing plan based at least in part upon the information documenting the plurality of measured characteristics of the one or more units of substrate, wherein the printing plan comprises:
the unique unit identifier corresponding to each unit included in the printing plan, and optionally the index identifiers corresponding to a beginning location and an end location of any partial unit included in the printing plan; and
one or more of:
- at least one screen having one or more characteristics tailored at least in part to at least one color value based upon the measured characteristics;
- a mapping of color specifications for the plurality of instances of the printed image indexed to the location along the length of each unit or partial unit thereof; and
- a mapping of one or more no-print locations indexed to the location along the length of each unit or partial unit thereof;
- a printing system configured to print the plurality of instances on the one or more units of substrate in accordance with the printing plan.

16. The system of claim 15, wherein the printing system comprises a digital printing system configured to adopt a first ink combination for a first location within the one or more units of substrate and a second ink combination for a second location within the one or more units of substrate.

17. The system of claim 15, wherein the printing system comprises system for printing with a printing plate, wherein the printing plate is derived from the at least one screen.

18. A method for designing a printing plan for printing a plurality of instances of a printed image on a substrate, the method comprising:
receiving information documenting a plurality of measured characteristics for one or more units of substrate for receiving the plurality of instances of the printed image, each unit having a unique unit identifier, the unit having a length from a beginning to an end of the unit and an index system with index identifiers for identifying discrete locations along the length the unit, each measured characteristic corresponding to a measurement obtained from a measurement location within the unit and indexed to the measurement location;
developing a printing plan based at least in part upon the information documenting the plurality of measured characteristics of the one or more units of substrate, wherein the printing plan comprises:
the unique unit identifier corresponding to each unit included in the printing plan, and optionally the index identifiers corresponding to a beginning location and an end location of any partial unit included in the printing plan; and one or more of:
- at least one screen having one or more characteristics tailored at least in part to at least one color value based upon the measured characteristics;
- a mapping of color specifications for the plurality of instances of the printed image indexed to the location along the length of each unit or partial unit thereof; and
- a mapping of one or more no-print locations indexed to the location along the length of each unit or partial unit thereof.

19. A method for printing a plurality of instances of a printed image on a substrate, the method comprising:
   receiving one or more units of substrate for receiving the plurality of instances of the printed image, each unit having a unique unit identifier, the unit having a length from a beginning to an end of the unit and an index system with index identifiers for identifying discrete locations along the length the unit;
   receiving information documenting a plurality of measured characteristics for each unit of substrate, each measured characteristic corresponding to a measurement obtained from a measurement location within the unit and indexed to the measurement location;
   receiving a printing plan based at least in part upon the information documenting the plurality of measured characteristics of the one or more units of substrate, wherein the printing plan comprises:
   the unique unit identifier corresponding to each unit included in
   the printing plan, and optionally the index identifiers corresponding to a beginning location and an end location of any partial unit included in the printing plan; and
   one or more of:
   at least one screen having one or more characteristics tailored at least in part to at least one color value based upon the measured characteristics;
   a mapping of color specifications for the plurality of instances of the printed image indexed to the location along the length of each unit or partial unit thereof; and
   a mapping of one or more no-print locations indexed to the location along the length of each unit or partial unit thereof
   printing the plurality of instances of the printed image on the one or more units of substrate in accordance with the printing plan.

20. Non-transitory memory media programmed with machine readable instructions for causing a processor to perform the steps of:
   receiving information documenting a plurality of measured characteristics for one or more units of substrate for receiving the plurality of instances of the printed image, each unit having a unique unit identifier, the unit having a length from a beginning to an end of the unit and an index system with index identifiers for identifying discrete locations along the length the unit, each measured characteristic corresponding to a measurement obtained from a measurement location within the unit and indexed to the measurement location;
   developing a printing plan based at least in part upon the information documenting the plurality of measured characteristics of the one or more units of substrate, wherein the printing plan comprises:
   the unique unit identifier corresponding to each unit included in the printing plan, and optionally the index identifiers corresponding to a beginning location and an end location of any partial unit included in the printing plan; and
   one or more of:
   at least one screen having one or more characteristics tailored at least in part to at least one color value based upon the measured characteristics;
   a mapping of color specifications for the plurality of instances of the printed image indexed to the location along the length of each unit or partial unit thereof; and
   a mapping of one or more no-print locations indexed to the location along the length of each unit or partial unit thereof.

21. Non-transitory memory media programmed with machine readable instructions for causing a processor to perform the steps of:
   receiving information documenting a plurality of measured characteristics for one or more units of substrate for receiving the plurality of instances of the printed image, each unit having a unique unit identifier, the unit having a length from a beginning to an end of the unit and an index system with index identifiers for identifying discrete locations along the length the unit, each measured characteristic corresponding to a measurement obtained from a measurement location within the unit and indexed to the measurement location;
   receiving a printing plan based at least in part upon the information documenting the plurality of measured characteristics of the one or more units of substrate, wherein the printing plan comprises:
   the unique unit identifier corresponding to each unit included in the printing plan, and optionally the index identifiers corresponding to a beginning location and an end location of any partial unit included in the printing plan; and
   one or more of:
   at least one screen having one or more characteristics tailored at least in part to at least one color value based upon the measured characteristics;
   a mapping of color specifications for the plurality of instances of the printed image indexed to the location along the length of each unit or partial unit thereof; and
   a mapping of one or more no-print locations indexed to the location along the length of each unit or partial unit thereof
   printing the plurality of instances of the printed image on the one or more units of substrate in accordance with the printing plan.

* * * * *

UNITED STATES PATENT AND TRADEMARK OFFICE
CERTIFICATE OF CORRECTION

PATENT NO. : 12,360,715 B2  
APPLICATION NO. : 18/730652  
DATED : July 15, 2025  
INVENTOR(S) : Barry Ben Ezra Page 1 of 1

It is certified that error appears in the above-identified patent and that said Letters Patent is hereby corrected as shown below:

On the Title Page

In Column 1, Line 1-2, Item (71) the name of the Applicant "Advanced Vision Technology (A. V. T.)" should read -- Advanced Vision Technology (A.V.T.) --

In Column 1, Line 1, Item (73) the name of the Assignee "Advaced Vision Technology (A.V.T.)" should read -- Advanced Vision Technology (A.V.T.) --

Signed and Sealed this  
Sixteenth Day of September, 2025

Coke Morgan Stewart  
*Acting Director of the United States Patent and Trademark Office*